United States Patent [19]
Cook

[11] Patent Number: 5,454,170
[45] Date of Patent: Oct. 3, 1995

[54] ROBOT TO PEDESTAL ALIGNMENT HEAD

[75] Inventor: Roger D. Cook, Beaverton, Oreg.

[73] Assignee: VLSI Technology Inc., San Jose, Calif.

[21] Appl. No.: 205,208

[22] Filed: Mar. 2, 1994

[51] Int. Cl.⁶ .............................. B23Q 17/22; G01B 5/25
[52] U.S. Cl. .................................. 33/645; 33/644; 33/533;
414/935; 73/865.9
[58] Field of Search ........................... 33/645, 533, 626,
33/644, 832, 833, 613, 557, 560, 503; 414/935;
73/865.8, 865.9

[56] References Cited

U.S. PATENT DOCUMENTS

| | | | |
|---|---|---|---|
| 1,643,570 | 9/1927 | Bartholdy | 33/557 |
| 3,177,589 | 4/1965 | Peeler | 33/833 |
| 3,461,566 | 8/1969 | Gerstner | 33/533 |
| 5,179,863 | 1/1993 | Uchida et al. | 33/645 |
| 5,245,759 | 9/1993 | Pearson | 33/644 |

FOREIGN PATENT DOCUMENTS

| | | | |
|---|---|---|---|
| 54653 | 3/1987 | Japan | 33/645 |
| 39611 | 2/1991 | Japan | 33/644 |
| 1569523 | 6/1990 | Russian Federation | 33/644 |

*Primary Examiner*—Christopher W. Fulton

[57] ABSTRACT

An apparatus and method for aligning an automated semiconductor wafer handling device with a semiconductor wafer receiving device. An alignment head is attached to the semiconductor wafer handling device in place of a wafer gripper assembly. The alignment head has at least one dial indicator disposed thereon. The ends of the dial indicators are arranged such that they are located in the same position a semiconductor wafer would occupy during normal operation of the automated semiconductor wafer handling device. As the automated semiconductor wafer handling device is activated, the alignment head is brought within close proximity to the semiconductor wafer receiving device. In so doing, the ends of the dial pins contact the surface of the semiconductor wafer receiving device thereby indicating the relative position and alignment of the automated semiconductor wafer handling device with respect to the semiconductor wafer receiving device. In a similar manner, the alignment head also indicates the relative position of the automated semiconductor wafer handling device with respect to a semiconductor wafer dispersing device.

26 Claims, 7 Drawing Sheets

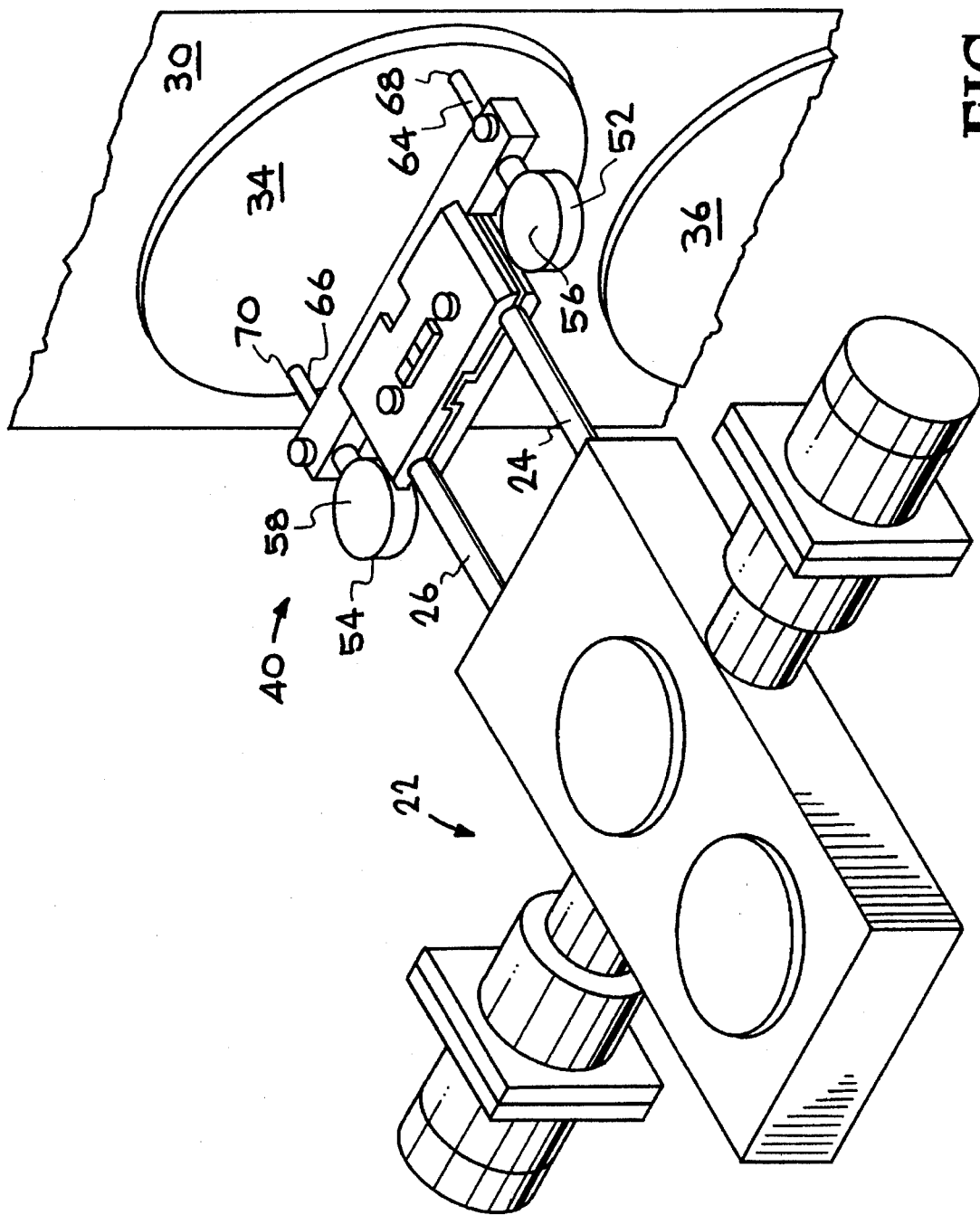

ROBOT TO PEDESTAL ALIGNMENT HEAD

BACKGROUND OF THE INVENTION

1. Field of the Invention

The present claimed invention relates to the field of semiconductor wafer fabrication. More specifically, the present claimed invention relates to the alignment of wafer handling and receiving devices used in automated semiconductor wafer fabrication processes.

2. Prior Art

Many of the current semiconductor fabrication processes utilize robotic or automated semiconductor wafer handling devices. These robotic or automated devices are frequently used to convey semiconductor wafers from one position to another during the numerous fabrication or process steps used in the formation of semiconductor devices. The following is one example of the operation of a typical automated semiconductor wafer handling device found in, for example, a metal etching system such as the 8330 Precision Etch System by Applied Materials of Santa Clara, Calif. A semiconductor wafer gripper assembly is located on the distal end of extension rods, or arms, of the automated semiconductor wafer handling device. When the automated device is in a resting or "home" position, the wafer gripper assembly is proximate to a shuttle plate of a semiconductor wafer dispersing device. The semiconductor wafer dispersing device moves the shuttle plate towards a cassette of pre-processed semiconductor wafers wherein a pre-processed wafer is transferred onto the shuttle plate. The wafer dispersing device then causes the shuttle plate to return to a position proximate to the wafer gripper assembly's home position. Upon activation, the extension rods of the automated handling device extend to move the wafer gripper assembly to a position wherein the gripper assembly is able to grasp the semiconductor wafer present on the shuttle plate of the wafer dispersing device.

Next, the automated semiconductor wafer handling device changes position such that the semiconductor wafer secured in the wafer gripper assembly is moved proximate to a semiconductor wafer receiving device. Commonly, the wafer receiving device will have numerous stations, or pedestals, on which the semiconductor wafer may be placed. One type of wafer receiving device having numerous pedestals is referred to as a hexode. In a hexode, the semiconductor wafer receiving device is comprised of a six-sided columnar structure having three vertically stacked pedestals on each side. Thus, the hexode can accommodate 18 wafers at a single time. The surface of each pedestal is vertically oriented such that the semiconductor wafers are positioned "standing up", with the back surface of the wafer against the pedestal. A support button is present at the base of each pedestal, to support the semiconductor wafer.

Thus, the automated semiconductor wafer handling device must be able to place a wafer on each of the three pedestals present on each of the six sides of the hexode of the wafer receiving device. Typically, the hexode rotates so that only one side of the hexode is positioned to receive wafers from the automated wafer handling device at a time. The placement of a semiconductor wafer onto a pedestal of the wafer receiving device is repeated until each of the 18 pedestals present on the hexode is filled.

After the wafers present on the hexode have been processed, one side at a time of the hexode is presented to the handling device for removal of the processed wafers from the pedestals. After the automated handling device has picked up a processed wafer, the handling device returns to the home position. At the home position, the wafer gripper assembly deposits the processed wafer onto an empty shuttle plate of the wafer dispersing device. The wafer dispersing device moves the shuttle plate to a position wherein the processed wafer is inserted into a cassette used to hold processed wafers. These steps are also repeated until all the processed wafers have been removed from the pedestal and placed into the cassette.

In order to effectively and safely place the wafer onto the pedestal of the wafer receiving device in the correct position, several critical parameters must be met by the automated wafer handling device. When placing a semiconductor wafer onto a pedestal, the extension rods on which the wafer gripper assembly is attached must extend to exactly the right distance. If the extension rods extend too far, the wafer gripper assembly will be forced against the wafer receiving device causing damage or even breakage of the wafer. If the extension rods do not extend far enough, when the wafer gripper assembly releases the semiconductor wafer, the wafer will not be placed on the pedestal. In such a case, the wafer is simply dropped and is often ruined.

In addition to controlling the extension distance of the wafer gripper assembly, the height of the gripper assembly with respect to the pedestal must also be precisely controlled. If the gripper assembly approaches the wafer receiving device at too great of a height, when the wafer is released against the vertically oriented pedestal, the back surface of the wafer will slide down the face of the pedestal until the bottom edge of the wafer contacts the support button. The sliding motion of the back surface of the wafer against the pedestal will generate contaminate particles, and will also result in damage to the wafer. On the other hand, if the wafer approaches the pedestal at too low of a height, the bottom edge of the wafer will not be supported by the support button and the wafer will be dropped and ruined. Additionally, if the wafer approaches the pedestal at too low of a height, the back surface of the wafer may be forced against the support button located at the base of the pedestal and the wafer may be damaged or broken.

Furthermore, the wafer must be centered with respect to the pedestal. That is, when the wafer gripper assembly releases the wafer onto the pedestal, the center of the back surface of the wafer should be located directly over the center of the pedestal. This is done to insure that the wafer is resting securely against the pedestal.

Additionally, the automated wafer handling device must also be precisely aligned to insure that parallelism exists between the wafer assembly and the pedestal. That is, the automated wafer handling device must be aligned with the wafer receiving device such that when the wafer is presented to the pedestal by the wafer gripper assembly, the back surface of the semiconductor wafer is parallel to the surface of the pedestal. During fabrication of the semiconductor wafer, it may be necessary to apply an electrical bias to the wafer. The application of such an electrical bias is frequently done through the pedestal. That is, the surface of the pedestal is used to electrically bias the semiconductor wafer. In order to insure thorough contact between the semiconductor wafer and the pedestal, parallelism between the wafer and the pedestal must be achieved. Therefore, the automated wafer handling device must be aligned with the wafer receiving device such that the wafer gripper places the wafer onto the pedestal with the back surface of the wafer flush against the pedestal.

In an attempt to attain proper alignment between the automated wafer handling device and the wafer receiving device, alignment tools are often used. Many of the prior art alignment tools are comprised of a bulky elongated connecting pieces which are used to physically connect the automated wafer handling device to the wafer receiving device. These tools frequently require a substantial set-up time, involve complicated attachment procedures, and are extremely costly. Typically, one end of the alignment tool is attached to the base of the automated wafer handling device, and another end is attached to a pedestal of the wafer receiving device. The attachment of the tool to the pedestal is often performed using screws or other attachment devices. Therefore, in order to check the alignment of the wafer handling device with each of the pedestals on a wafer receiving device such as a hexode, the alignment tool must be attached to and detached from the hexode numerous times. Thus, the repeated attachment and detachment of the alignment tool to the wafer receiving device results in a lengthy set-up time to perform the alignment procedures using prior art alignment tools.

In addition to requiring substantial connections, many of the prior art alignment tools also require considerable disassembly of the automated wafer handling device. That is, in order to perform the alignment procedures, the wafer handling device must have several parts removed therefrom to accommodate the attachment of the bulky alignment tool to the wafer handling device.

In addition to the bulky prior art base alignment tool, a separate extension rod alignment tool is often attached to the extension rods of the automated wafer handling device. The position of the extension rod alignment tool is compared to the position of the base alignment tool. The position of the automated wafer handling device and the wafer receiving device is then adjusted according to the relative position of the two tools.

More specifically, the user programs stepper motors which control the motion of the automated wafer handling device. The user programs the stepper motors such that the motors cause the wafer handling device to move such that the alignment tool is positioned as desired with respect to the base alignment tool. The user may program the stepper motor such that the motor extends the extension arms, for example, 5 steps. The user then visually inspects the relative position of the base alignment and extension rod alignment tool. If the user believes that the extension rod tool has been inserted too far, the user may program the stepper motor to extend, for example 4 steps. The process is repeated until the user feels that the proper positioning and alignment of the two tools has been achieved. In so doing, it is intended that when the wafer gripper assembly is placed on the extension rods, the automated wafer handling device will position and align the gripper assembly as desired with respect to the pedestals of the wafer receiving device.

However, the comparison of the base alignment and the extension rod alignment tool and the programming of the stepper motors is based upon the visual observations of the user. Thus, different users may program the stepper motors differently. Therefore, the alignment tools of the prior art do not provide for uniformity of use among separate users.

Thus, the need has arisen for an inexpensive tool to align an automated wafer handling device with a wafer receiving device without requiring extensive disassembly of the wafer handling device, substantial set-up time, complicated attachment procedures, and which provides for uniformity of readings even when operated by separate users.

SUMMARY OF THE INVENTION

It is therefore an object of the present invention to provide an inexpensive alignment tool which eliminates the need for "eyeballing" of handling device to pedestal positioning, reduces the amount of wafer handling device disassembly required, does not require attachment to the pedestal, and which can be used to quickly give repeatable measurements of wafer handling device to pedestal positioning, such that separate users will obtain identical results. The above object has been achieved by an alignment head which is attached to an automated wafer handling device in place of a wafer gripper assembly. The alignment head has at least one dial indicator disposed thereon. The end of the dial indicator is arranged such that it is located in the same position a semiconductor wafer would occupy during normal operation of the automated semiconductor wafer handling device. As the automated semiconductor wafer handling device is activated, the alignment head of the present invention is brought within close proximity to the pedestal of the semiconductor wafer receiving device. In so doing, the ends of the dial pins contact the surface of the pedestal thereby indicating the relative position and alignment of the automated semiconductor wafer handling device with respect to the pedestal. Furthermore, the alignment head also indicates the relative position of the automated semiconductor wafer handling device with respect to a semiconductor wafer dispersing device.

By using dial indicator pins to quantitatively show the position of the alignment head with respect to the pedestal, the present claimed invention eliminates the need for "eyeballing" of positions as found in the prior art. In addition, the present claimed invention also allows multiple users to position the semiconductor wafer handling device and the semiconductor wafer receiving device in precisely the same alignment.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4B is a perspective view of an alignment head placed onto a wafer handling device and in contact with a wafer receiving device in accordance with the present claimed invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1A:
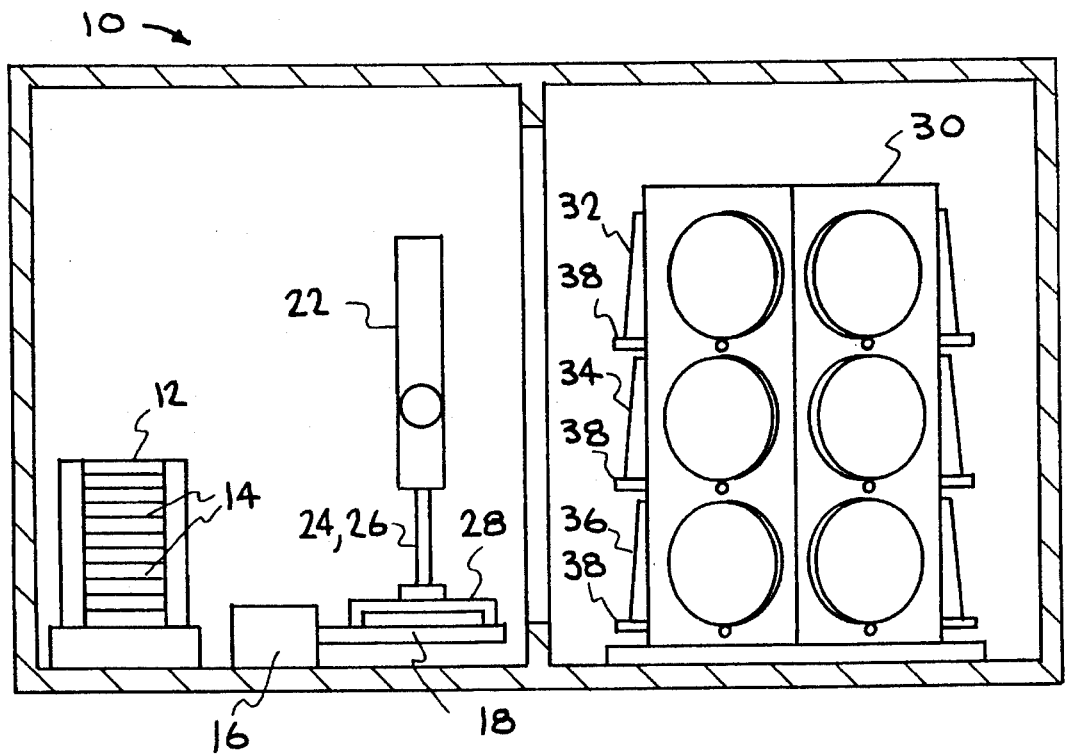
FIG. 1A is a simplified example of a prior art semiconductor processing system.

With reference now to FIG. 1A, a simplified example of a prior art semiconductor processing system 10 such as, for example, the 8330 Precision Etch System by Applied Materials of Santa Clara, Calif. is shown. Processing system 10 is comprised of a cassette 12 which contains semiconductor wafers 14. A semiconductor wafer dispersing device, or shuttle assembly 16 rotates a shuttle plate 18 to a position proximate to cassette 12. Shuttle plate 18 receives a semiconductor wafer 14 from cassette 12 and returns to a position distant from cassette 12. An automated semiconductor wafer handling device 22 having extension rods 24 and 26 (extension rod 26 obscured behind extension rod 24), and a wafer gripper assembly 28. Automated wafer handling device 22 is disposed in a "home" position with wafer gripper 28 located directly above shuttle plate 18.

Referring still to FIG. 1A, a wafer receiving device comprised of a hexode 30 having three vertically stacked and oriented pedestals 32, 34, and 36 on each of the six sides is shown. A support button 38 is present at the base of each of the pedestals 32, 34, and 36. Hexode 30 is able to rotate about a vertical axis located in the center of hexode 30 such that one side at a time of hexode 30 may be disposed facing towards automated semiconductor wafer handling device 22. Furthermore, hexode 30 can be used to apply an electrical bias to semiconductor wafers which are placed thereon.

Figure 1B:
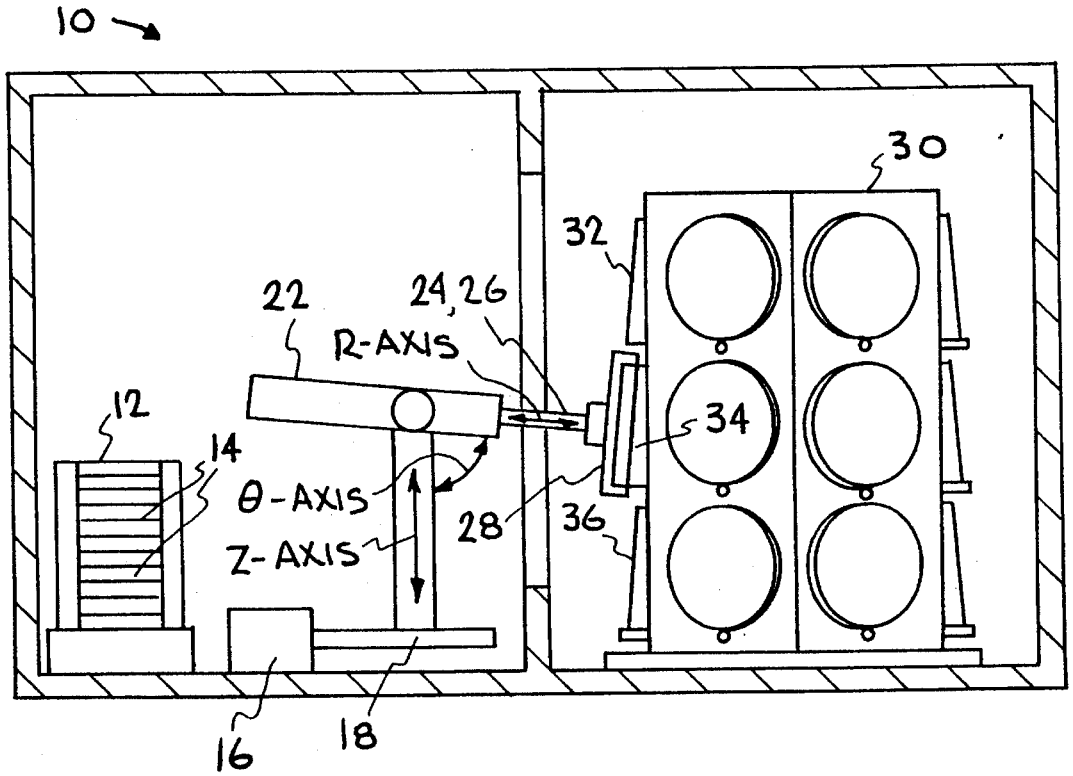
FIG. 1B is prior art semiconductor processing system of FIG. 1A with a wafer gripper assembly extending towards a pedestal of a wafer receiving device.

With reference now to FIG. 1B, prior art semiconductor processing system 10 is shown with wafer gripper assembly 28 of automated semiconductor wafer handling device 22 extending towards a pedestal 34 of hexode 30. As shown in FIG. 1B, wafer handling device 22 moves about several axes so that wafer gripper 28 is able to place a semiconductor wafer on any one of the three pedestals facing wafer handling device 22. Specifically, in the present processing system, wafer handling device 22 moves in a vertical direction about a "Z-axis." Rotational motion of wafer handling device 22 occurs about a "Θ-axis." Extension of extension rods 24 and 26, and attached wafer gripper assembly 28, is said to occur about an extension, or "R-axis." Motion of wafer handling device 22 along the above-mentioned axes is controlled by stepper motors, not shown. As can be seen in FIG. 1B, in order for wafer gripper assembly 28 to correctly place a semiconductor wafer onto pedestal 34 of hexode 30, wafer handling device 22 and wafer gripper assembly 28 must be precisely aligned with hexode 30.

Figure 2:
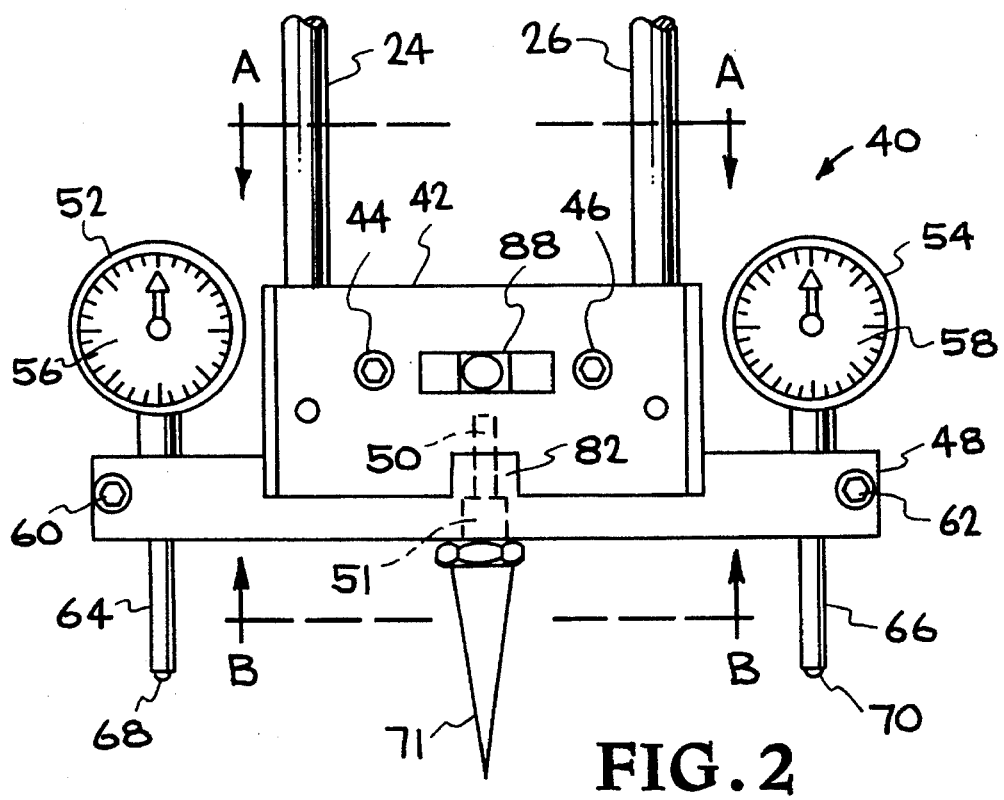
FIG. 2 is a top view of an alignment head for precisely aligning the position of a wafer handling device with a semiconductor wafer receiving device in accordance with the present claimed invention.

With reference now to FIG. 2, a top view of an alignment head 40 for precisely aligning the position of a wafer handling device with a semiconductor wafer receiving device in accordance with the present claimed invention is shown. The following description of the present invention will begin with a detailed description setting forth the mechanical structure of alignment head 40. This description will then be followed by a detailed description setting forth the operation of the present invention.

A mounting block 42 is attached to the distal end of extension rods 24 and 26 in place of wafer gripper assembly 28 of FIGS. 1A and 1B. That is, before attaching alignment head 40 of the present claimed invention to extension rods 24 and 26, wafer gripper assembly 28 of FIGS. 1A and 1B is removed. In the present embodiment, mounting block 42 is comprised of two halves which are disposed on opposite sides of extension rods 24 and 26, such that rods 24 and 26 are "sandwiched" between the two halves. In the present embodiment, screws 44 and 46 are used to hold the two halves of mounting block 42 around extension rods 24 and 26.

Referring still to FIG. 2, a dial indicator support bar 48 is shown coupled to mounting block 42. In the present embodiment of the present claimed invention, dial indicator support bar 48 is retained between the top and bottom halves of mounting block 42. Additionally, dial indicator support bar 48 is attached to mounting block 42 using a screw, not shown, which extends from the front side of dial indicator support bar 48, through support bar 48 and into mounting block 42 as indicated by dotted line 50. Dial indicator support bar 48 also has a slightly larger concentric screw hole 51 formed extending from the front surface of dial indicator support bar 48 partially therethrough.

Referring again to FIG. 2, in the present embodiment, two dial indicators 52 and 54 having faces 56 and 58 are mounted to dial indicator support bar 48 at opposite ends thereof. Dial indicators 52 and 54 are retained within cavities formed through dial indicator support bar 48. Screws 60 and 62 are used to secure the shafts 64 and 66 of dial indicators 52 and 54 in dial indicator support bar 48. Although screws 60 and 62 are used in the present embodiment, the present claimed invention is also well suited to the use of other attachment means well known in the art. The ends 68 and 70 of dial indicators 52 and 54 are located in the same position occupied by a semiconductor wafer when held by wafer gripper assembly 28 of FIGS. 1A and 1B during normal operation of processing system 10 of FIGS. 1A and 1B.

With reference still to FIG. 2, a removable center point 71 is removably attachable to the center of dial indicator support bar 48. Removable center point 71 is centrally attachable to dial indicator support bar such that the distal end of removable center point 71 resides along a center line projected straight out from the center of a semiconductor wafer when the wafer is held by wafer gripper assembly 28 of FIGS. 1A and 1B during normal operation. In the preferred embodiment, removable center point 71 has a threaded base, not shown, which is screwed into larger concentric screw hole 51. Although a threaded base is used to attach center point 71 to dial indicator support bar 48 in the preferred embodiment, the present claimed invention is also well suited to any of the other numerous attachment means well known in the art.

Figures 3A, 3B:
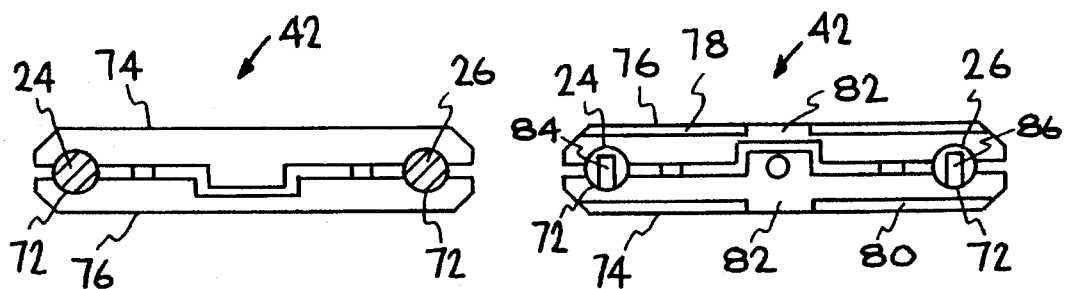
FIG. 3A is a view taken along line A—A of FIG. 2 of a mounting block in accordance with the present claimed invention.
FIG. 3B is a view taken along line B—B of FIG. 2 of a mounting block in accordance with the present claimed invention.

Referring now to FIG. 3A, a view of mounting block 42 taken along line A—A of FIG. 2 is shown. Recessions 72 are formed into botch the top half 74 and the bottom half 76 of mounting block 42. When the two halves 74 and 76 of mounting block 42 are coupled together, recessions 72 in halves 74 and 76 combine to form two cylindrical cavities for receiving and retaining extension rods 24 and 26 therein.

With reference now to FIG. 3B, another view of mounting block 42 taken along line B—B of FIG. 2 is shown. Again, top half 74 and bottom half 76 are coupled together such that recessions 72 combine to form cylindrical cavities for receiving and retaining extension rods 24 and 26 therein. As shown in FIG. 3B, top half 74 of mounting block 42 has a protruding ridge 78 located along the top surface thereof. Likewise, bottom half 76 has a protruding ridge 80 located along the bottom surface thereof. Protruding ridges 78 and 80 are located on mounting block halves 74 and 76 such that when halves 74 and 76 are coupled together protruding ridges 78 and 80 retain dial indicator support bar 48 of FIG. 2 therebetween. Additionally, a notch 82 is centrally located in both protruding ridges 78 and 80.

Figure 3C:
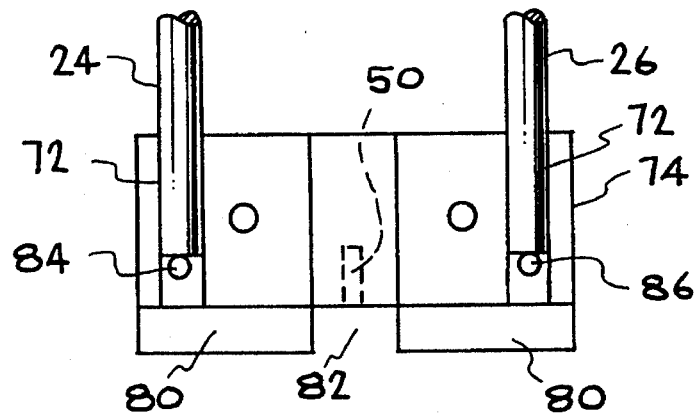
FIG. 3C is a view of the bottom half of the mounting block of FIG. 2 in accordance with the present claimed invention.

With reference now to FIG. 3C, a top view of bottom half 76 of mounting block 42 of FIG. 2 is shown. Notch 82 is clearly shown formed into protruding ridge 80. Notch 82 is located in protruding ridges 78 and 80 such that it is centrally located with respect to screw hole 50. In the present embodiment, dowel locating pins 84 and 86 are used to insure that extension rods 24 and 26 are properly positioned within recessions 72.

Referring again to FIG. 2, mounting block 42 also has an extension rod level indicator 88, disposed thereon. In the preferred embodiment, extension rod level indicator 88 is comprised of a bubble level, however, the present claimed invention is also well suited to the use of any of the other numerous level indicating devices well known in the art.

IN OPERATION

Figure 4A:
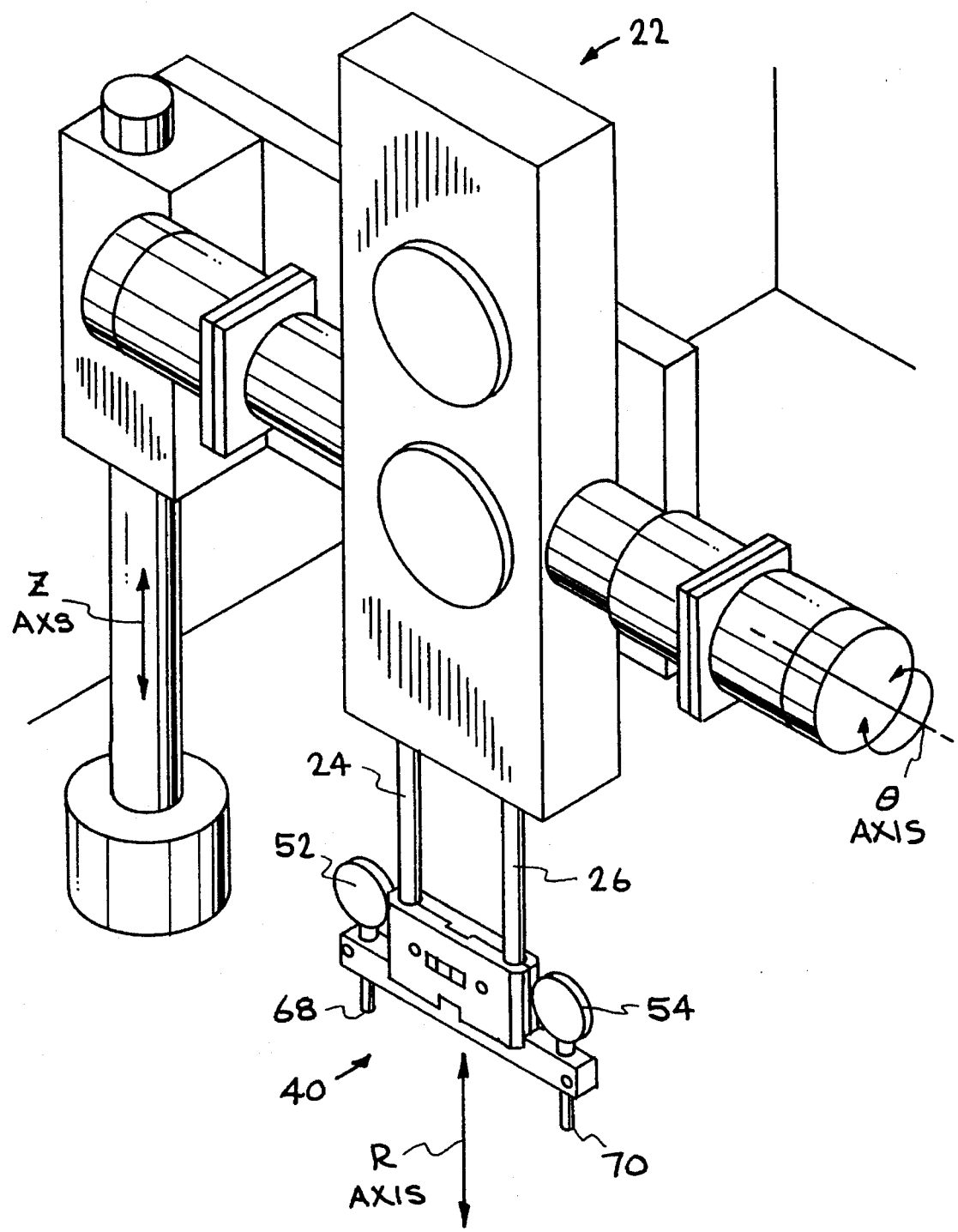
FIG. 4A is a perspective view of an alignment head placed onto a wafer handling device in accordance with the present claimed invention.

The following is a detailed description of the operation of the present invention. As shown in FIG. 4A, alignment head 40 is placed onto extension rods 24 and 26 in place of wafer gripper assembly 28 of FIGS. 1A and 1B. Dowel locating pins 84 and 86 of FIG. 3C insure that alignment head 40 is placed over extension rods 24 and 26 such that the ends 68 and 70 of dial indicators 52 and 54 are located in the same plane a semiconductor wafer would occupy when held by wafer gripper assembly 28 of FIGS. 1A and 113. Thus, alignment head 40 of the present claimed invention exactly duplicates the position of a semiconductor wafer when held by wafer gripper assembly 28 of FIGS. 1A and 1B. In addition to regulating the distance which alignment head 40 is placed over extension rods 24 and 26, dowel locating pins 84 and 86 of FIG. 3C provide for uniform attachment of alignment head 40. That is, each user will place alignment head 40 at the exact same position on extension rods 24 and 26. In so doing, the present claimed invention eliminates the need for any visual estimation or eyeballing of the position of alignment head 40 when attaching it to extension rods 24 and 26.

With reference now to FIG. 4B, a perspective view of the present claimed invention is shown after attachment of alignment head 40 to extension rods 24 and 26, automated semiconductor wafer handling device 22 is activated such that extension rods 24 and 26 and alignment head 40, attached thereto, are brought within close proximity to semiconductor wafer receiving device 30. As shown in FIG. 4B, as automated semiconductor wafer handling device 22 is activated, ends 68 and 70 of dial indicator pins 52 and 54 contact pedestal 34 of hexode 30. As ends 68 and 70 contact pedestal 34, they are compressed into shafts 64 and 66 resulting in a change of the readings on faces 56 and 58 of dial indicators 52 and 54. The present claimed invention allows the user to record an optimum reading for dial indicators 52 and 54. That is, the user may record the reading on the faces 56 and 58 of dial indicators 52 and 54 when automated semiconductor wafer handling device 22 is perfectly aligned with wafer receiving device 30. In such an instance, wafer gripper assembly 28 of FIGS. 1A and 1B will extend the semiconductor wafer the appropriate distance towards pedestal 34. By recording the optimum dial indicator reading, the user enables subsequent users to duplicate the desired alignment. That is, the present invention, unlike the prior art, provides for uniformity of alignment even among separate users. Additionally, in another embodiment of the present claimed invention, marks, not shown, are located on the pedestal to indicate the exact position at which ends 68 and 70 of dial indicator pins 52 and 54 should contact each pedestal.

For example, a subsequent user can activate automated semiconductor wafer handling device 22 such that alignment head 40 contacts pedestal 34. If the readings on the faces 56 and 58 of dial indicators 52 and 54 are larger than the recorded optimum setting, then the subsequent user knows that the alignment of automated semiconductor wafer handling device 22 with semiconductor wafer receiving device 30 must be adjusted so that wafer gripper assembly 28 will not force the semiconductor wafer against pedestal 34. In order to correct, the misalignment, the subsequent user simply reduces the distance which extension rods 24 and 26 extend along the R-axis shown in FIG. 4A towards pedestal 34. This is done by reducing the number of steps performed by the stepper motor, not shown which controls the extension of rods 24 and 26 along the R-axis shown in FIG. 4A.

In the prior art, any modification to automated semiconductor wafer handling device 22 was done by trial and error. That is, in order to correct any over extension of rods 24 and 26 using prior art devices, the user was required to repeatedly adjust the stepper motor and then observe the position of the wafer gripper assembly with respect to the pedestal. The user would repeat these steps until the wafer handling device appeared to be extended the proper distance towards pedestal 34. In the present claimed invention, however, the need for such eyeballing and repeated measurements is eliminated. That is, in the preferred embodiment of the present claimed invention, the readings of dial indicators 52 and 54 determine what adjustments are necessary to the extension stepper motor after a single insertion of alignment head 40 towards each pedestal. Hence, if the readings of dial indicators 52 and 54 are, for example, 10 units larger than the optimum reading, the first user may record that, for example, 5 steps of the stepper motor were eliminated to provide for proper extension. In so doing, each subsequent adjustment can be based on the fact that for every two units greater or less than the optimum dial indicator reading, the stepper motor must be adjusted by a single step. Thus, the present claimed invention not only provides for uniformity of results among subsequent users, but also eliminates the need for repeated eyeballing and insertion of the alignment tool towards each pedestal when determining the alignment along the R-axis shown in FIG. 4A.

Figure 4C:
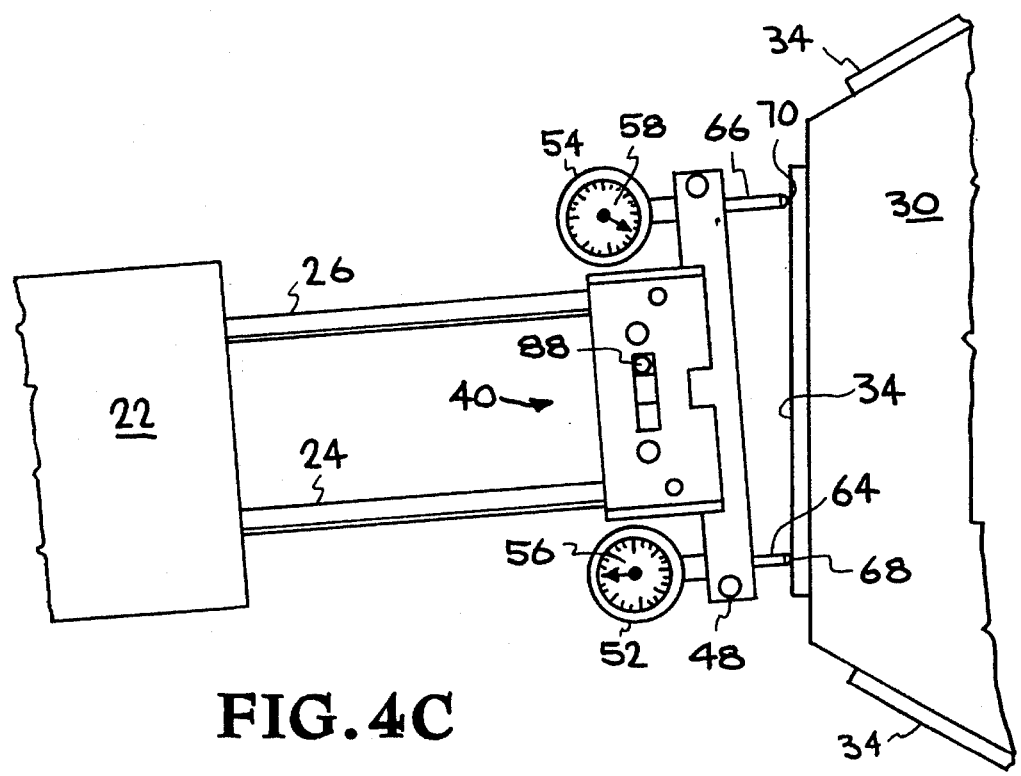
FIG. 4C is a top view of an alignment head in contact with a wafer receiving device in accordance with the present claimed invention.

With reference now to FIG. 4C, a top view of alignment head 40 in contact with pedestal 34 is shown. As shown in FIG. 4C, ends 68 and 70 of dial indicators 52 and 54 contact pedestal 34. In addition to indicating the relative extension distance of automated semiconductor wafer handling device 22 of FIG. 4B towards hexode 30, the present claimed invention also indicates whether or not one side of wafer gripper assembly 28 of FIGS. 1A and 1B will be positioned closer to pedestal 30 than the other side. By examining the readings on faces 56 and 58 of dial indicators 52 and 54, the user can readily ascertain whether or not automated semiconductor wafer handling device 22 of FIG. 4B is aligned such that both sides of wafer gripper assembly 28 are equally extended towards hexode 30. That is, if the readings of the dial indicators 52 and 54 are different, as shown in FIG. 4C, then the user knows that the position of wafer gripper assembly 28 of FIGS. 1A and 1B must be slightly altered.

Referring still to FIG. 4C, bubble level 88 indicates whether or not extension rods 24 and 26 reside within the same horizontal plane. If one of rods 24 and 26 is positioned above or below the other rod, the user then adjusts the position of rods 24 and 26 until bubble level 88 indicates that both rods 24 and 26 occupy the same horizontal plane.

Figure 4D:
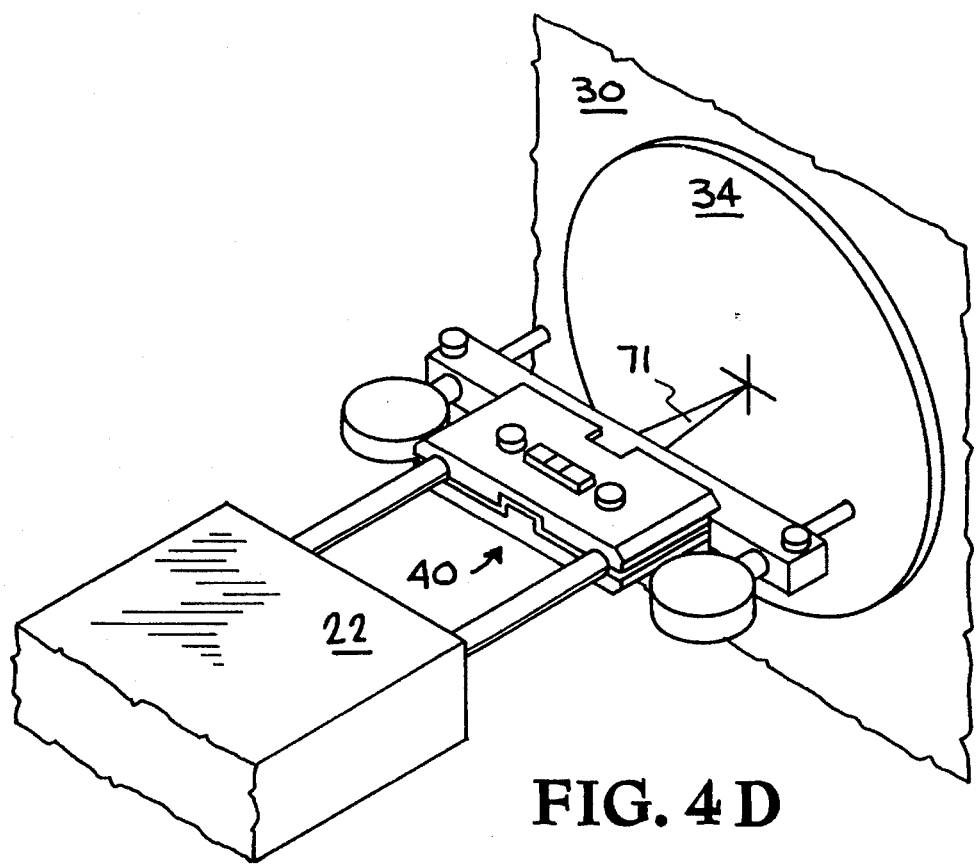
FIG. 4D is a perspective view of an alignment head with a removable center point attached thereto in accordance with the present claimed invention.

Referring next to FIG. 4D, a perspective view of alignment head 40 with removable center point 71 attached thereto is shown. As automated semiconductor wafer handling device 22 of FIG. 4B is activated, removable center point 71 contacts pedestal 34. In one embodiment of the present claimed invention, the center of each pedestal of wafer receiving device 30 is marked. In so doing, when removable center point 71 contacts each pedestal the user is able to immediately determine whether or not center point 71 is contacting each pedestal in the center thereof. That is, if removable center point 71 does not contact the mark located at the center of the pedestal, the User can adjust the position of automated semiconductor wafer handling device 22 of FIG. 4B accordingly. In order to raise or lower the position of center point 71 until center point 71 is placed in the center of the desired pedestal, the user simply reduces or increases the distance which wafer handling device 22 of FIG. 4B extends along the Z-axis shown in FIG. 4A. This is done by reducing or increasing the number of stops performed by the stepper motor, not shown which controls the motion of wafer handling device 22 of FIGS. 1A and 1B along the Z-axis shown in FIG. 4A. By aligning wafer handling device 22 with the center of the desired pedestal such that wafer gripper assembly 28 of FIGS. 1A and 1B places a wafer in the center of the pedestal, the present claimed invention prevents wafer gripper assembly 28 of FIGS. 1A and 1B from forcing a wafer against support buttons 38 of the pedestals. As a result, the present claimed invention reduces breakage of semiconductor wafers.

With reference still to FIG. 4D, in the present embodiment of the present invention, removable center point 71 also indicates to the user whether the center of wafer gripper assembly 28 of FIGS. 1A and 1B will be positioned to the left or the right of the center the desired pedestal. When removable center point 71 contacts each pedestal the user is able to immediately determine whether or not center point 71 is contacting each pedestal in the center thereof. That is, if removable center point 71 contacts the pedestal to the left or the right of the mark located at the center of the pedestal, the user adjusts the position of automated semiconductor wafer handling device 22 of FIG. 4B accordingly. Therefore, because alignment head 40 of the present claimed invention exactly duplicates the position of a semiconductor wafer when held by wafer gripper assembly 28 of FIGS. 1A and 1B, the present claimed invention provides for relative measurements of both the height and distance of the center of a semiconductor wafer from the center of a pedestal during normal operation of automated semiconductor wafer handling device 22 of FIG. 4B.

Figure 4E:
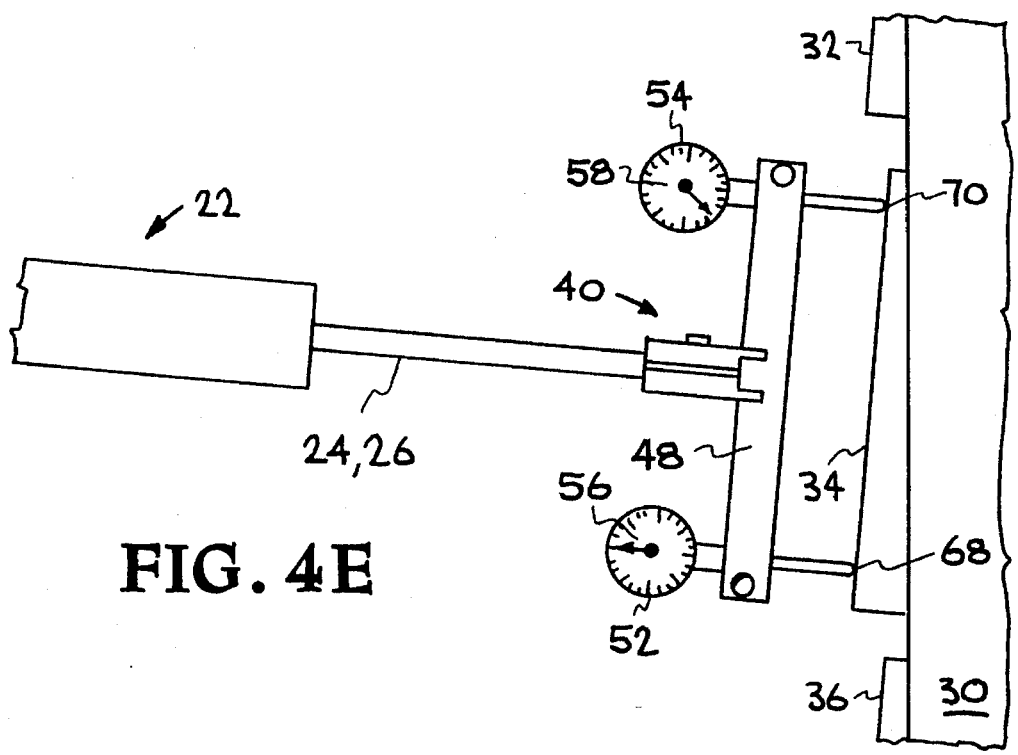
FIG. 4E is a side view of an alignment head having a dial indicator support bar attached thereto in a second position in accordance with the present claimed invention.

Referring next to FIG. 4E, a side view of the present claimed invention having dial indicator support bar 48 in a second position is shown. In addition to indicating the extension, height, and center position of a wafer with respect to each pedestal, the present claimed invention also indicates the relative parallelism of the surface of a semiconductor wafer to the surface of each pedestal. In order to place dial indicator support bar 48 in the second position shown in FIG. 4E, dial indicator support bar 48 is unscrewed or detached from its first location between protruding ridges 78 and 80 of mounting block halves 74 and 76, respectively. Dial indicator support bar 48 is then reattached to mounting block 42 in a second position, wherein the second position is offset 90 degrees from the first position. More specifically, dial indicator support bar 48 is disposed within notch 82 of protruding ridges 78 and 80. In the present embodiment, dial indicator support bar 48 is reattached to mounting block 42 using the same screw, not shown, inserted into the same screw hole 50 of FIG. 2, which was used to attach dial indicator support bar to mounting block 42 in the first position.

With reference still to FIG. 4E, automated semiconductor device 22 of FIG. 4B is activated such that alignment head 40 having dial indicator support bar 48 disposed in the second position is brought into contact with the desired pedestal. As shown in FIG. 4E, ends 68 and 70 of dial indicators 52 and 54 contact the top and bottom areas of pedestal 34. In so doing, the relative vertical orientation of the semiconductor wafer with respect to the surface of pedestal 34 is determined. By examining the readings on faces 56 and 58 of dial indicators 52 and 54, the user can readily ascertain whether or not automated semiconductor wafer handling device 22 of FIG. 4B is aligned such that the top edge and the bottom edge of wafer gripper assembly 28 of FIGS. 1A and 1B are equally extended towards hexode 30. That is, if the readings of the dial indicators 52 and 54 are different, as shown in FIG. 4E, then the user knows that the position of wafer gripper assembly 28 of FIGS. 1A and 1B must be slightly altered. In order to correct the alignment of wafer gripper assembly 28 of FIGS. 1A and 1B with pedestal 34, the user simply adjusts angle which wafer handling device 22 of FIG. 4B extends along the Θ-axis shown in FIG. 4A. This is done by reducing or increasing the number of steps performed by the stepper motor, not shown which controls the motion of wafer handling device 22 of FIG. 4B along the Θ-axis shown in FIG. 4A. Additionally, in order to insure that wafer gripper assembly 28 of FIGS. 1A and 1B remains centered with respect to pedestal 34, the distance which wafer handling device 22 of FIG. 4B extends along the Z-axis shown in FIG. 4A must also be slightly adjusted. This is done by reducing or increasing the number of steps performed by the stepper motor, not shown which controls the motion of wafer handling device 22 of FIG. 4B along the Z-axis shown in FIG. 4A.

In one embodiment of the present claimed invention, vertically aligned marks are made at the top and bottom edge of each pedestal. In so doing, when dial indicators 52 and 54 contact each pedestal the user is able to immediately determine whether or not dial indicators 52 and 54 are contacting each pedestal in the correct position. That is, if dial indicators 52 and 54 do not contact the marks located on the pedestal, the user adjusts the position of automated semiconductor wafer handling device 22 of FIG. 4B accordingly.

With reference still to FIG. 4E, by properly aligning wafer handling device 22 of FIG. 4B with dial indicator support bar 48 in both the first and second positions, parallelism of a semiconductor wafer with respect to the surface of a pedestal can be quantitatively guaranteed. This is in direct opposition to the prior art in which such an alignment is based solely on visual adjustments, or eyeballing of the position of the wafer handling device with respect to the pedestal.

Thus, in order to properly align wafer handling device 22 of FIG. 4B with wafer receiving device 30, each of the above-described measurements is performed on each of the 18 pedestals present on hexode 30. That is, ends 68 and 70 of dial indicators 52 and 54, attached to alignment head 40, are brought into contact with each of the 18 pedestal present on hexode 30. Removable center point 71 of FIG. 4D is also brought into contact with each of the 18 pedestals. Furthermore, alignment head 40 contacts each pedestal with dial indicator support bar 48 in both the first and second position to insure that parallelism is achieved between the semiconductor wafer and the surface of each of the 18 pedestal.

Figure 4F:
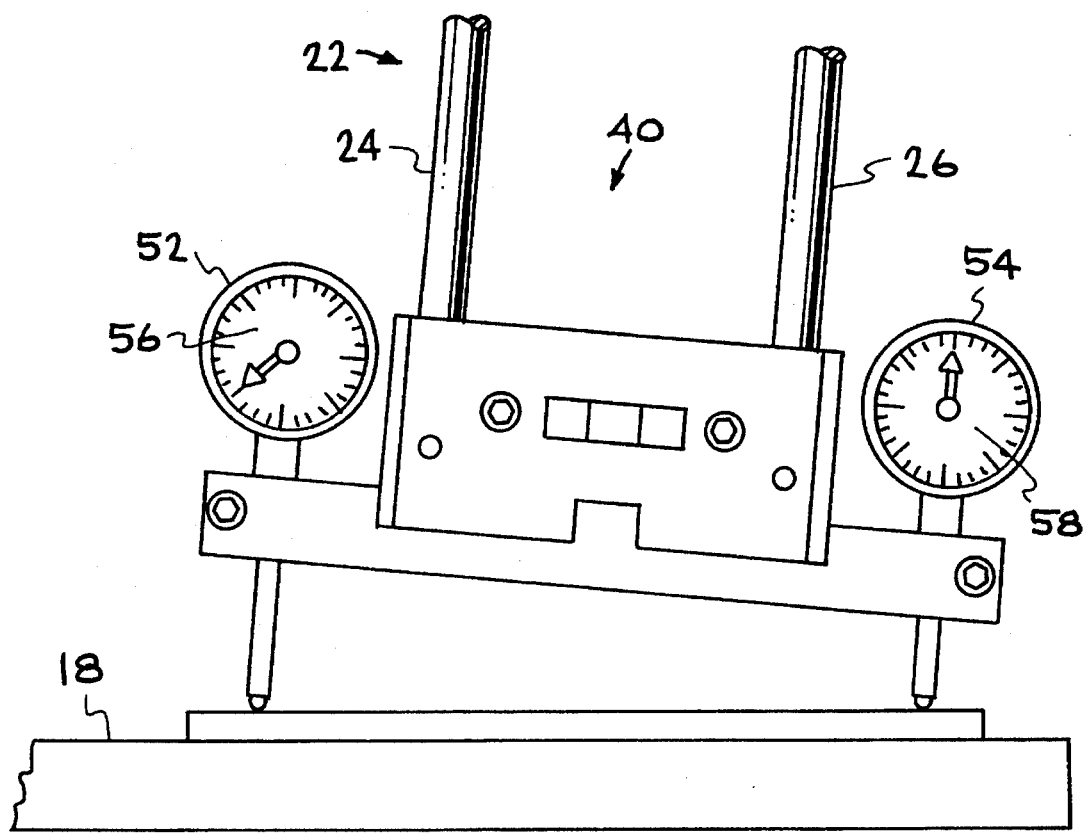
FIG. 4F is a side view of a wafer handling device located in the "home" position with an alignment head attached thereto in accordance with the present claimed invention.

With reference now to FIG. 4F, a side view of the present claimed invention with wafer handling device 22 in the "home" position is shown. As shown in FIG. 4F, when wafer handling device 22 is in the home position, alignment head 40 is disposed directly above shuttle plate 18 of shuttle assembly 16. The orientation of wafer gripper assembly 28 of FIGS. 1A and 1B with shuttle plate 18 is extremely important. If wafer gripper assembly 28 of FIGS. 1A and 1B is misaligned with shuttle plate 18, wafer gripper assembly 28 of FIGS. 1A and 1B will improperly pick up semiconductor wafers from with shuttle plate 18 during normal operations of processing system 10 of FIGS. 1A and 1B. This mishandling can result in dropped, or broken wafers. Additionally, even if wafer gripper assembly 28 of FIGS. 1A and 1B is properly aligned with hexode 30 of FIGS. 1A and 1B, the wafer may still be improperly placed onto the pedestal thereon. Conversely, wafer gripper assembly 28 of FIGS. 1A and 1B may properly remove a wafer from hexode 30 of FIGS. 1A and 1B, but may improperly place the wafer onto shuttle plate 18. As a result, the processed wafer may be damaged as shuttle plate 18 attempts to place the wafer into cassette 12 of FIGS. 1A and 1B. Therefore, in the same manner as set forth above extension rods 24 and 26 extend along the R-axis shown in FIG. 4A towards shuttle plate 18. This is done by activating the stepper motor, not shown which controls the extension of rods 24 and 26 along the R-axis shown in FIG. 4A.

In the present embodiment of the present claimed invention, the readings of dial indicators 52 and 54 determine what adjustments are necessary to the extension stepper motor such that wafer gripper assembly 28 of FIGS. 1A and 1B will be extended the proper distance towards shuttle plate 18. Additionally, as set forth above, the present claimed invention allows each subsequent user to exactly duplicate the settings of a previous user. Hence, if the readings of dial indicators 52 and 54 are, for example, larger than a previously determined optimum reading, the user adjust the number of steps of the stepper motor until the optimum reading is obtained on dial indicators 52 and 54. That is, in the preferred embodiment of the present claimed invention, the readings of dial indicators 52 and 54 determine what adjustments are necessary to the extension stepper motor after a single insertion of alignment head 40 towards each pedestal. Hence, if the readings of dial indicators 52 and 54 are, for example, 10 units larger than the optimum reading, the first user may record that, for example, 5 steps of the stepper motor were eliminated to provide for proper extension. In so doing, each subsequent adjustment can be based on the fact that for every two units greater or less than the optimum dial indicator reading, the stepper motor must be adjusted by a single step. Thus, the present claimed invention not only provides for uniformity of results among subsequent users, but also eliminates the need for repeated eyeballing and insertion of the alignment tool towards shuttle plate 18.

With reference still to FIG. 4F, in addition to indicating the relative extension distance of automated semiconductor wafer handling device 22 of FIG. 41B towards shuttle plate 18, the present claimed invention also indicates whether or not one side of wafer gripper assembly 28 of FIGS. 1A and 1B will be positioned closer to shuttle plate 18 than the other side. By examining the readings on faces 56 and 58 of dial indicators 52 and 54, the user can readily ascertain whether or not automated semiconductor wafer handling device 22 of FIG. 4B is aligned such that both sides of wafer gripper assembly 28 are equally extended towards shuttle plate 18. That is, if the readings of the dial indicators 52 and 54 are different, as shown in FIG. 4F, then the user knows that the position of wafer gripper assembly 28 of FIGS. 1A and 1B must be slightly altered.

Figure 4G:
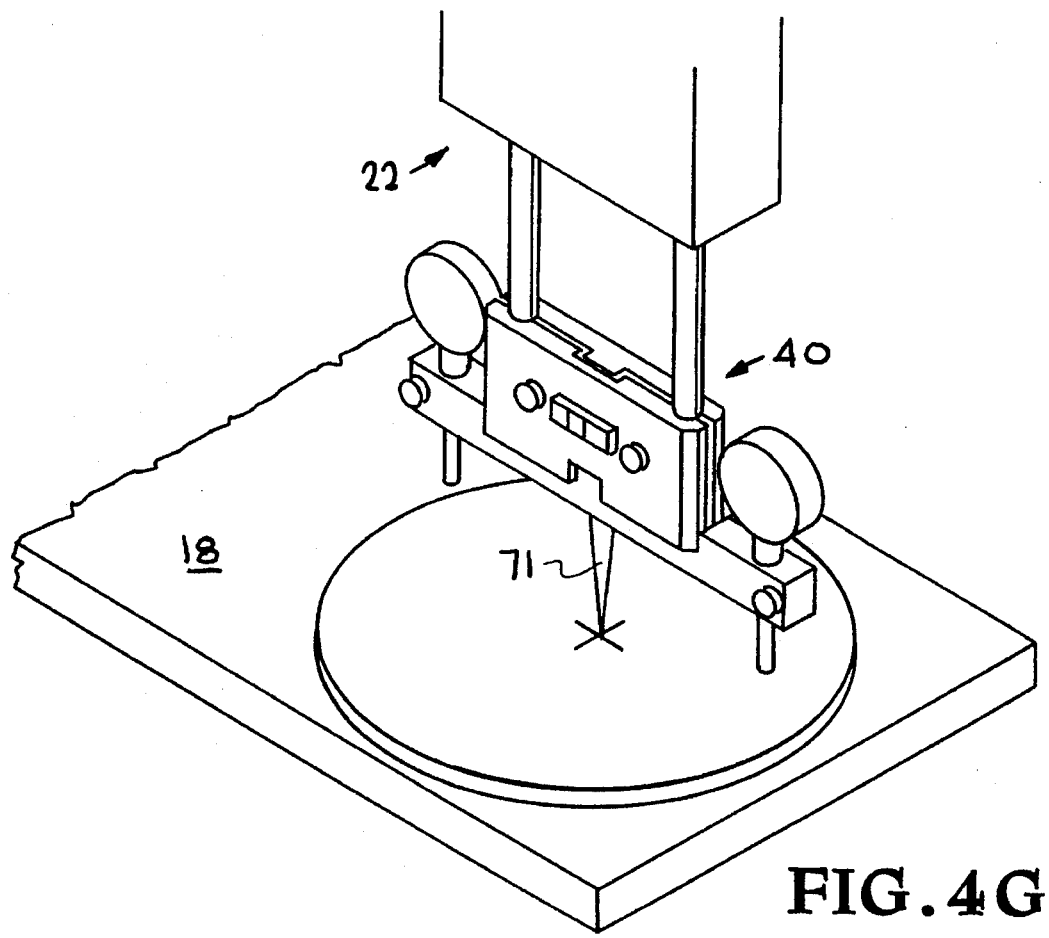
FIG. 4G is a side view of a wafer handling device located in the "home" position with an alignment head attached thereto, and with the alignment head having a removable center point coupled thereto, in accordance with the present claimed invention.

Referring next to FIG. 4G, a side view of alignment head 40 with removable center point 71 attached thereto is shown. With semiconductor wafer handling device 22 of FIG. 4B in the home position, removable center point 71 contacts shuttle plate 18. In one embodiment of the present claimed invention, the center of shuttle plate 18 is marked. In so doing, when removable center point 71 contacts shuttle plate 18, the user is able to immediately determine whether or not center point 71 is contacting the center thereof. That is, if removable center point 71 does not contact the mark located at the center of shuttle plate 18, the user can adjust the position of automated semiconductor wafer handling device 22 of FIG. 4B accordingly.

Figure 4H:
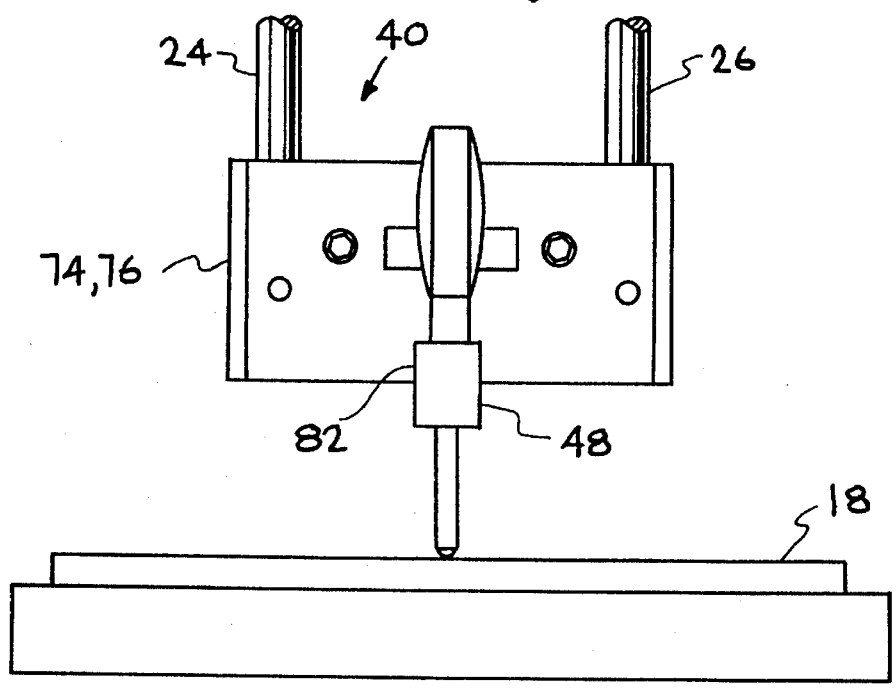
FIG. 4H is an end view of an alignment head having a dial indicator support bar disposed in the second position thereon in accordance with the present claimed invention.

Referring next to FIG. 4H, an end view of the present claimed invention as shown in FIG. 4F is shown with alignment head 40 having dial indicator support bar 48 disposed in the second position. In addition to indicating the extension, and center position of a wafer with respect to shuttle plate 18, the present claimed invention also indicates the relative parallelism of the surface of a semiconductor wafer to the surface of shuttle plate 18. As described in detail above, in order to place dial indicator support bar 48 in the second position shown in FIG. 4H, dial indicator support bar 48 is unscrewed or detached from its first location between protruding ridges 78 and 80 of mounting block halves 74 and 76, respectively. Dial indicator support bar 48 is then reattached to mounting block 42 in a second position, wherein the second position is offset 90 degrees from the first position.

With reference still to FIG. 4H, automated semiconductor wafer handling device 22 of FIG. 4B is activated such that alignment head 40 having dial indicator support bar 48 disposed in the second position is brought into contact with the shuttle plate 18. By properly aligning alignment head 40 with dial indicator support bar 48 in both the first and second positions, parallelism of a semiconductor wafer with respect to the surface of shuttle plate 18 can be quantitatively guaranteed. This is in direct opposition to the prior art in which such an alignment is based solely on visual adjustments, or eyeballing of the position of the wafer handling device with respect to the shuttle plate.

In conclusion, the present claimed invention provides numerous benefits over the alignment tools of the prior art. Specifically, the present claimed invention allows for quantitative measurements of the extension, height, centering, and parallelism alignment of a semiconductor wafer, held by a wafer handling device, with respect to a pedestal of a wafer receiving device. The present claimed invention also indicates whether or not the extension rods of a wafer handling device reside in the same horizontal plane. Additionally, the present claimed invention indicates the alignment of a wafer handling device with respect to a shuttle plate of a wafer dispersing device. The present claimed invention allows all of these alignments to be performed without rigidly fixing of an alignment tool to the wafer receiving device. As a result, the present claimed invention allows the user to precisely align the wafer handling device with the wafer receiving device, and the wafer dispersing device, in a much shorter time than has previously been possible using prior art alignment tools.

Furthermore, the present claimed invention also provides for uniformity of the above-mentioned alignments. That is, the present claimed invention allows subsequent users to achieve precisely the same alignment specifications. Specifically, the present claimed invention quantifies numerous alignment distances and required stepper motor adjustments. In so doing, the repeated "trial and error" methods and inaccurate "eyeballed" adjustments required with prior art alignment tools are eliminated.

Unlike the prior art, the present claimed invention does not require substantial disassembly of the wafer handling device. Instead, the present claimed invention merely requires the removal of a wafer gripper assembly from the wafer handling device, and the attachment of a compact multi-functional alignment head thereto. Finally, as opposed to the bulky and expensive prior art alignment tools, the present claimed invention is compact, lightweight and can be inexpensively produced.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. An apparatus for aligning an automated semiconductor wafer handling device, having extension rods with a wafer gripper attachment region located thereon, with a pedestal of a semiconductor wafer receiving device when said wafer gripper attachment region of said automated semiconductor wafer handling device is brought within close proximity to said pedestal comprising:

an alignment head removably coupled to said wafer gripper assembly attachment region, said alignment head further comprising;
means for indicating the height of said wafer gripper assembly attachment region with respect to said pedestal,
means for indicating the distance of said wafer gripper assembly attachment region from said pedestal,
means for indicating the distance of the center of said wafer gripper assembly attachment region from the center of said pedestal,
means for indicating the parallelism of said wafer gripper assembly attachment region and said pedestal.

2. The alignment apparatus of claim 1 wherein said alignment head is further comprised of:

a mounting block having front and back surfaces, said mounting block having cavities formed into said back surface thereof and extending at least partially into said mounting block towards said front surface thereof, said mounting block removably coupled to said extension rods of said automated semiconductor wafer handling device with said wafer gripper assembly attachment region of said extension rods disposed within said cavities of said mounting block, a dial indicator support bar having front and back surfaces, said dial indicator support bar having at least one cavity formed therethrough extending completely from said back surface to said front surface thereof, said dial indicator support bar removably coupled to said mounting block, said dial indicator support bar adjustably attachable to said mounting block such that said dial indicator support bar may be removably coupled to said mounting block in a plurality of orientations, at least one dial indicator, said at least one dial indicator comprised of a hollow cylindrical shaft having first and second ends, a pin having first and second ends, and a dial gauge disposed adjacent to said back surface of said dial indicator support bar and coupled to said second end of said shaft, said shaft disposed within said at least one cavity formed in said dial indicator support bar, said pin resiliently and movably disposed within said shaft such that said first end of said pin extends from said first end of said shaft beyond said front surface of said dial indicator support bar, said second end of said pin coupled to said dial gauge such that compression of said first end of said pin towards said shaft changes the reading on said dial gauge thereby indicating the position of said wafer gripper attachment region with respect to said pedestal.

3. The alignment apparatus of claim 2 wherein said means for indicating the height of said wafer gripper assembly attachment region with respect to said pedestal is further comprised of a center pin coupled to the center of said front surface of said dial indicator support bar such that as said wafer gripper assembly attachment region is brought within close proximity to said pedestal, said center pin contacts said pedestal thereby indicating the height of said wafer gripper attachment assembly region with respect to said pedestal.

4. The alignment apparatus of claim 2 wherein said means for indicating the distance of said wafer gripper assembly attachment region from said pedestal is further comprised of said at least one dial indicator coupled to said dial indicator support bar such that as said wafer gripper assembly attachment region is brought within close proximity to said pedestal, said first end of said pin of said at least one dial indicator contacts said pedestal and is compressed thereby indicating on said dial indicator the distance of said wafer gripper assembly attachment region from said pedestal.

5. The alignment apparatus of claim 2 wherein said means for indicating the distance of the center of said wafer gripper assembly attachment region from the center of said pedestal is further comprised of a center pin coupled to the center of said front surface of said dial indicator support bar such that as said wafer gripper assembly attachment region is brought within close proximity to said pedestal, said center pin contacts said pedestal thereby indicating the distance of said center of said wafer gripper assembly attachment region from said center of said pedestal.

6. The alignment apparatus of claim 2 wherein said means for indicating the parallelism of said wafer gripper assembly attachment region and said pedestal is further comprised of said dial indicator support bar adjustably attachable to said mounting block in a plurality of orientations and at least two dial indicators mounted thereon, such that said at least two dial indicators give readings of the relative position of said wafer gripper attachment region with respect to said pedestal when said dial indicator support bar is attached to said mounting block in each of said plurality of positions, thereby indicating the parallelism of said wafer gripper attachment region with respect to said pedestal.

7. The alignment apparatus of claim 2 further comprising means for indicating the horizontal alignment of said extension rods of said automated semiconductor wafer handling device.

8. The alignment apparatus of claim 7 wherein said means for indicating the horizontal alignment of said extension rods of said automated semiconductor wafer handling device is further comprised of a horizontal level indicating device coupled to said mounting block.

9. The alignment apparatus of claim 2 wherein said mounting block is further comprised of a top and a bottom portion, each of said portions having a recessed area formed therein for receiving said extension rods, said top and said bottom portions coupled together such that said recessed areas combine to form said cavities for receiving said extension rods, and such that said extension rods are disposed between said top and said bottom portions within said cavities.

10. The alignment apparatus of claim 9 wherein said mounting block is further comprised of a first recession centrally located on said front surface of said mounting block, said first recession disposed extending completely across said front surface of said top and said bottom portions of said mounting block along a first direction.

11. The alignment apparatus of claim 10 wherein said mounting block is further comprised of a second recession centrally located on said front surface of said mounting block, said second recession disposed extending completely across said front surface of said top and said bottom portions of said mounting block along a second direction, said second direction being perpendicular to said first direction.

12. The alignment apparatus of claim 10 wherein said dial indicator support bar is disposed within said first recession in said front surface of said mounting block.

13. The alignment apparatus of claim 11 wherein said dial indicator support bar is disposed within said second recession in said front surface of said mounting block.

14. An apparatus for aligning an automated semiconductor wafer handling device, having extension rods with a wafer gripper assembly attachment region located thereon, with a semiconductor wafer receiving device comprising:

an alignment head removably coupled to said wafer gripper assembly attachment region on said extension rods of said automated semiconductor wafer handling device, said alignment head further comprising, a mounting block having front and back surfaces, said mounting block having cavities formed into said back surface thereof and extending at least partially into said mounting block towards said front surface thereof, said mounting block removably coupled to said automated semiconductor wafer handling device with said wafer gripper assembly attachment region of said extension rods disposed within said cavities of said mounting block, a dial indicator support bar having front and back surfaces, said dial indicator support bar having at least one cavity formed therethrough extending completely from said back surface to said front surface thereof, said dial indicator support bar removably coupled to said mounting block, said dial indicator support bar adjustably attachable to said mounting block such that said dial indicator support bar may be removably coupled to said mounting block in a plurality of orientations, at least one dial indicator, said at least one dial indicator comprised of a hollow cylindrical shaft having first and second ends, a pin having first and second ends, and a dial gauge disposed adjacent to said back surface of said dial indicator support bar and coupled to said second end of said shaft, said shaft disposed within said at least one cavity formed in said dial indicator support bar, said pin resiliently and movably disposed within said shaft such that said first end of said pin extends from said first end of said shaft beyond said front surface of said dial indicator support bar, said second end of said pin coupled to said dial gauge such that compression of said first end of said pin towards said shaft changes the reading on said dial gauge, thereby indicating the position of said wafer gripper attachment region with respect to said semiconductor wafer receiving device, said alignment head disposed on said wafer gripper attachment region such that as said wafer gripper assembly attachment region is brought within close proximity to said semiconductor wafer receiving device, said alignment head indicates the position of said automated wafer handling device with respect to said semiconductor wafer receiving device.

15. The alignment apparatus of claim 9 wherein said mounting block is further comprised of a top and a bottom portion, each of said portions having a recessed area formed therein for receiving said extension rods, said top and said bottom portions coupled together such that said recessed areas combine to form said cavities for receiving said extension rods, and such that said extension rods are disposed between said top and said bottom portions within said cavities.

16. The alignment apparatus of claim 14 further comprising means for indicating the horizontal alignment of said extension rods of said automated semiconductor wafer handling device.

17. The alignment apparatus of claim 16 wherein said means for indicating the horizontal alignment of said extension rods of said automated semiconductor wafer handling device is further comprised of a horizontal level indicating device coupled to said mounting block.

18. The alignment apparatus of claim 14 wherein said mounting block is further comprised of a top and a bottom portion, each of said portions having a recessed area formed therein for receiving said extension rods, said top and said bottom portions coupled together such that said recessed areas combine to form said cavities for receiving said extension rods, and such that said extension rods are disposed between said top and said bottom portions within said cavities.

19. The alignment apparatus of claim 18 wherein said mounting block is further comprised of a first recession centrally located on said front surface of said mounting block, said first recession disposed extending completely across said front surface of said top and said bottom portions of said mounting block along a first direction.

20. The alignment apparatus of claim 19 wherein said mounting block is further comprised of a second recession centrally located on said front surface of said mounting block, said second recession disposed extending completely across said front surface of said top and said bottom portions of said mounting block along a second direction, said second direction being perpendicular to said first direction.

21. The alignment apparatus of claim 20 wherein said dial indicator support bar is disposed within said first recession in said front surface of said mounting block.

22. The alignment apparatus of claim 20 wherein said dial indicator support bar is disposed within said second recession in said front surface of said mounting block.

23. A method for aligning an automated semiconductor wafer handling device, having extension rods with a wafer gripper assembly attached to a region thereon, with a semiconductor wafer receiving device comprising the steps of:

removing said wafer gripper assembly from said wafer gripper attachment region of said extension rods, removably coupling an alignment head to said wafer gripper attachment region of said extension rods, said alignment head having at least one dial indicator arranged within a dial indicator support bar attached to said alignment head in a first position, activating said automated semiconductor wafer handling device such that said alignment head is brought within close proximity to said semiconductor wafer receiving device, thereby engaging said at least one dial indicator against the surface of said semiconductor wafer receiving device so that the alignment of said wafer handling device with respect to said wafer receiving device is indicated, detaching said dial indicator support bar and said at least one dial indicator from said first position on said alignment head, attaching said dial indicator support bar and said at least one dial indicator to said alignment head in a second position, and activating said automated semiconductor wafer handling device such that said alignment head is brought within close proximity to said semiconductor wafer receiving device, thereby engaging said at least one dial indicator in said second position against the surface of said semiconductor wafer receiving device so that the parallelism of said wafer handling device with respect to said wafer receiving device is indicated.

24. A method for aligning an automated semiconductor wafer handling device, having extension rods with a wafer gripper assembly attached to a region thereon, with a semiconductor wafer receiving device comprising the steps of:

removing said wafer gripper assembly from said wafer gripper attachment region of said extension rods, removably coupling an alignment head to said wafer gripper attachment region of said extension rods, said alignment head having at least one dial indicator arranged within a dial indicator support bar attached to said alignment head in a first position, activating said automated semiconductor wafer handling device such that said alignment head is brought within close proximity to said semiconductor wafer receiving device, thereby engaging said at least one dial indicator against the surface of said semiconductor wafer receiving device so that the alignment of said wafer handling device with respect to said wafer receiving device is indicated, centrally attaching a center point to said dial indicator support bar, and activating said automated semiconductor wafer handling device such that said alignment head is brought within close proximity to said semiconductor wafer receiving device, thereby engaging said center point against the surface of said semiconductor wafer receiving device so that the distance from the center of said wafer gripper attachment region to the center of said wafer receiving device is indicated.

25. A method for aligning an automated semiconductor wafer handling device, having extension rods with a wafer gripper assembly attached to a region thereon, with a semiconductor wafer receiving device comprising the steps of:

removing said wafer gripper assembly from said wafer gripper attachment region of said extension rods, removably coupling an alignment head to said wafer gripper attachment region of said extension rods, said alignment head having at least one dial indicator arranged within a dial indicator support bar attached to said alignment head in a first position, activating said automated semiconductor wafer handling device such that said alignment head is brought within close proximity to said semiconductor wafer receiving device, thereby engaging said at least one dial indicator against the surface of said semiconductor wafer receiving device so that the alignment of said wafer handling device with respect to said wafer receiving device is indicated, deactivating said automated semiconductor wafer handling device such that said alignment head is returned to a home position with said alignment head disposed in close proximity to a semiconductor wafer dispersing device, thereby engaging said at least one dial indicator against the surface of said semiconductor wafer dispersing device so that the alignment of said automated semiconductor wafer handling device with respect to said wafer dispersing device is indicated, detaching said dial indicator support bar and said at least one dial indicator from said first position on said alignment head, attaching said dial indicator support bar and said at least one dial indicator to said alignment head in a second position, and returning said automated semiconductor wafer handling to a home position with said alignment head disposed in close proximity to a semiconductor wafer dispersing device, thereby engaging said at least one dial indicator in said second position against the surface of said semiconductor wafer dispersing device so that the parallelism of said wafer handling device with respect to said wafer dispersing device is indicated.

26. A method for aligning an automated semiconductor wafer handling device, having extension rods with a wafer gripper assembly attached to a region thereon, with a semiconductor wafer receiving device comprising the steps of:

removing said wafer gripper assembly from said wafer gripper attachment region of said extension rods, removably coupling an alignment head to said wafer gripper attachment region of said extension rods, said alignment head having at least one dial indicator arranged within a dial indicator support bar attached to said alignment head in a first position, activating said automated semiconductor wafer handling device such that said alignment head is brought within close proximity to said semiconductor wafer receiving device, thereby engaging said at least one dial indicator against the surface of said semiconductor wafer receiving device so that the alignment of said wafer handling device with respect to said wafer receiving device is indicated, centrally attaching a center point to said dial indicator support bar, and deactivating said automated semiconductor wafer handling device such that said alignment head is returned to a home position with said alignment head disposed in close proximity to a semiconductor wafer dispersing device, thereby engaging said center point against the surface of said semiconductor wafer dispersing device so that the distance from the center of said wafer gripper attachment region to the center of said wafer dispersing device is indicated.

* * * * *